United States Patent
Rabsahl et al.

(10) Patent No.: US 11,939,967 B2
(45) Date of Patent: Mar. 26, 2024

(54) MOBILE THICK MATTER PUMP

(71) Applicant: Schwing GmbH, Herne (DE)

(72) Inventors: Rudolf Rabsahl, Dortmund (DE);
Boris Streier, Recklinghausen (DE)

(73) Assignee: Schwing GmbH, Herne (DE)

( * ) Notice: Subject to any disclaimer, the term of this patent is extended or adjusted under 35 U.S.C. 154(b) by 261 days.

(21) Appl. No.: 17/440,619

(22) PCT Filed: Mar. 19, 2020

(86) PCT No.: PCT/EP2020/057601
§ 371 (c)(1),
(2) Date: Sep. 17, 2021

(87) PCT Pub. No.: WO2020/188030
PCT Pub. Date: Sep. 24, 2020

(65) Prior Publication Data
US 2022/0163022 A1    May 26, 2022

(30) Foreign Application Priority Data
Mar. 19, 2019  (DE) .................. 10 2019 107 006.6

(51) Int. Cl.
*F04B 15/02*  (2006.01)
*F04B 9/109*  (2006.01)
(Continued)

(52) U.S. Cl.
CPC ............. *F04B 15/02* (2013.01); *F04B 9/109* (2013.01); *F04B 9/1178* (2013.01);
(Continued)

(58) Field of Classification Search
CPC ........ F04B 15/023; F04B 35/06; F04B 15/02; F04B 9/1178; F04B 35/002; F04B 53/14;
(Continued)

(56) References Cited

U.S. PATENT DOCUMENTS 2,957,430 A * 10/1960 Naef .................. F04B 9/105
417/403
3,398,693 A * 8/1968 Schumann ............ F04B 9/1178
280/43.23
(Continued)

FOREIGN PATENT DOCUMENTS

| DE | 2805015 C2 | 10/1989 |
| DE | 19751082 B4 | 1/2005 |
| FR | 1447478 A | 7/1966 |

OTHER PUBLICATIONS

International Search Report and Written Opinion issued in International Application PCT/EP2020/057601 (with English translation of Search Report), dated Aug. 19, 2020, 19 pages.

*Primary Examiner* — Peter J Bertheaud
(74) *Attorney, Agent, or Firm* — Faegre Drinker Biddle & Reath LLP

(57) ABSTRACT

A mobile thick matter pump for conveying thick matter includes a trailer chassis, a pump unit, and a drive motor. The pump unit is arranged on the trailer chassis. The drive motor is arranged on the trailer chassis and configured to drive the pump unit to convey thick matter. The pump unit is arranged eccentrically on the trailer chassis such that the pump unit is laterally offset in a first direction relative to a longitudinal center plane of the trailer chassis. The drive motor is arranged eccentrically on the trailer chassis such that the drive motor is laterally offset relative to the longitudinal center plane in a second direction opposite to the first direction.

4 Claims, 6 Drawing Sheets

Figure 1:
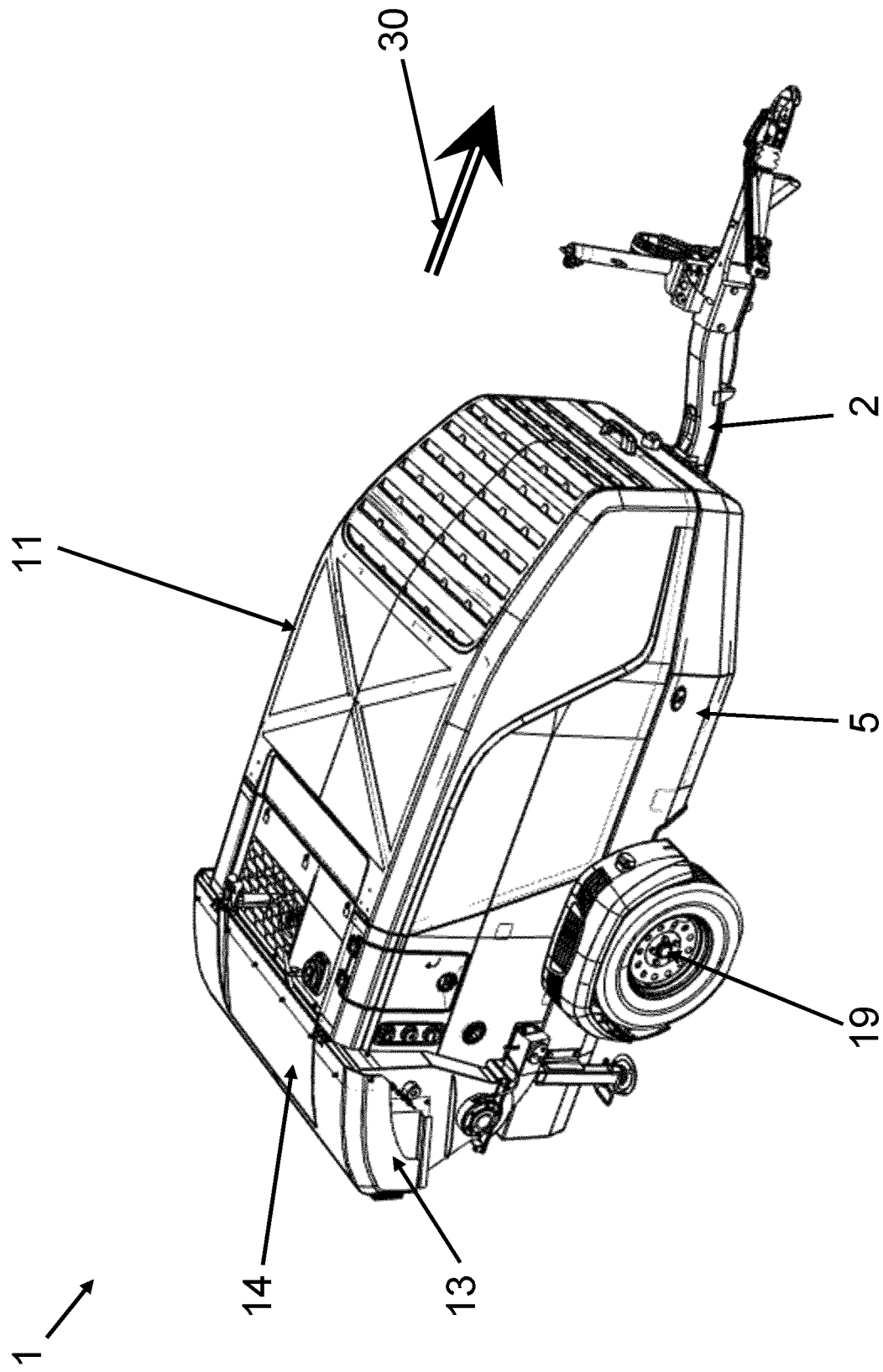

(51) Int. Cl.

| | | |
|---|---|---|
| *F04B 9/117* | (2006.01) | |
| *F04B 17/03* | (2006.01) | |
| *F04B 17/06* | (2006.01) | |
| *F04B 35/00* | (2006.01) | |
| *F04B 35/06* | (2006.01) | |
| *F04B 53/08* | (2006.01) | |
| *F04B 53/14* | (2006.01) | |
| *F04B 53/16* | (2006.01) | |
| *F16M 3/00* | (2006.01) | |

(52) U.S. Cl.
CPC ............ *F04B 15/023* (2013.01); *F04B 17/03* (2013.01); *F04B 17/06* (2013.01); *F04B 35/002* (2013.01); *F04B 35/06* (2013.01); *F04B 53/08* (2013.01); *F04B 53/14* (2013.01); *F04B 53/16* (2013.01); *F16M 3/00* (2013.01); *Y10S 417/90* (2013.01)

(58) Field of Classification Search
CPC .......... F04B 9/109; F04B 17/03; F04B 17/06; F04B 53/08; F04B 53/16; F04B 17/05; Y10S 417/90; F16M 3/00
See application file for complete search history.

(56) References Cited

U.S. PATENT DOCUMENTS

| | | | | |
|---|---|---|---|---|
| 3,609,065 | A * | 9/1971 | Wilson | F04B 7/0026 417/900 |
| 3,807,706 | A * | 4/1974 | Kugle | F04B 15/023 366/27 |
| 3,857,328 | A * | 12/1974 | Taylor | F04B 15/023 417/900 |
| 4,298,288 | A * | 11/1981 | Weisbrod | B28C 9/0454 366/11 |
| 4,527,959 | A | 7/1985 | Whiteman | |
| 4,616,979 | A | 10/1986 | Hynes et al. | |
| 8,235,441 | B2 * | 8/2012 | Pirwass | F16M 3/00 180/69.24 |

* cited by examiner

MOBILE THICK MATTER PUMP

CROSS-REFERENCE TO RELATED APPLICATION

This application is a national stage application of International Application No. PCT/EP2020/057601, filed 19 Mar. 2020, which claims priority to German Patent Application No. 10 2019 107 006.6, filed 19 Mar. 2019, both of which are herein incorporated by reference in their entireties.

The invention relates to a mobile thick matter pump for conveying thick matter, with a trailer chassis, a pump unit arranged on the trailer chassis and a drive motor arranged on the trailer chassis, which drives the pump unit for conveying thick matter.

Thick matter pumps known from the prior art and mounted on a trailer usually have a pump unit consisting of two hydraulic drive cylinders, a water box, two delivery pistons and a pipe diverter housing with the pipe diverter mounted centrally in the direction of travel, i.e. in the longitudinal direction of the trailer chassis above the wheel axle. Such two-cylinder piston pumps are preferably used for conveying concrete. However, the pump unit for conveying thick materials can, for example, be a single-cylinder piston pump, a worm pump, a rotor pump or the like. The drive motor, which drives the pump unit for conveying thick matter, is usually arranged above it. This arrangement has two major disadvantages. Firstly, the center of gravity of the trailer is located high above the wheel axle of the chassis, which results in unstable driving behavior of the trailer, which may weigh over two tons. On the other hand, the arrangement of the drive motor above the pump unit results in very poor accessibility to the pump unit, in particular to the water tank in the case of a two-cylinder piston pump, which, however, actually has to be opened regularly for cleaning, replacing the delivery pistons, etc.

It is therefore the task of the invention to specify an improved thick matter pump which allows a more stable driving behavior and a more compact design. In particular, the pump unit should be easily accessible and thus facilitate maintenance work.

This task is solved by a thick matter pump with the features of claim 1.

By the fact that the pump unit is arranged eccentrically on the trailer chassis, this means laterally offset in a first direction relative to the longitudinal center plane of the trailer chassis while the drive motor is also arranged eccentrically on the trailer chassis, namely laterally offset relative to the longitudinal center plane in a second direction opposite to the first direction, a low center of gravity of the mobile thick matter pump can be achieved, so that a more stable driving behavior is made possible. With the pump unit arranged laterally offset to the direction of travel of the chassis and the drive motor arranged laterally next to it, a compact structure can be advantageously realized that also offers excellent accessibility for maintenance work on the pump unit. The special arrangement of the pump unit and drive motor results in a very low center of gravity for the trailer concrete pump, and the arrangement of the drive motor next to the pump battery and a suitable arrangement of the other necessary units means that the water tank of the pump battery in particular remains very accessible for maintenance and repair work.

Advantageous embodiments and further developments of the invention result from the dependent claims. It should be noted that the features listed individually in the claims can also be combined with one another in any desired and technologically useful manner, thus revealing further embodiments of the invention.

According to the invention, it is provided that the pump unit is arranged opposite the drive motor with respect to the longitudinal center plane of the trailer chassis. With the arrangement of the pump unit opposite the drive motor, a balancing of the center of gravity towards the center of the trailer chassis can be realized, in that the masses of the pump unit and the drive motor balance out towards the center of the trailer chassis in the direction of travel. This makes it possible to achieve stable driving behavior of the trailer, particularly in curves.

A particularly preferred embodiment is one in which the trailer chassis comprises a body frame, with the pump unit and the drive motor are arranged side by side on the body frame. With the pump unit mounted adjacent to the drive motor, the body frame can have a very simple design and provides a low center of gravity for the mobile thick matter pump. Advantageously, the pump unit and the drive motor are mounted on the same cross beams of the body frame, so that a particularly light body frame with few cross beams can be realized.

A particularly advantageous embodiment of the invention provides that the pump unit is designed as a two-cylinder piston pump. Such a pump unit is particularly suitable for conveying thick materials and offers a compact design.

A particularly advantageous embodiment of the invention relates to the pump unit having a water box which is accessible from above via a free space formed above the water box. By arranging the pump unit and the drive motor side by side, a free space can be easily formed above the water box of the pump unit, through which the water box is easily accessible. This makes maintenance work, such as cleaning the water box and replacing delivery pistons of the pump unit, easy.

An advantageous embodiment of the invention provides that the drive motor mechanically drives a hydraulic pump, via which the pump unit is hydraulically driven. By coupling the drive motor and the pump unit via the hydraulic pump, it is very easy to realize the pump pressures required for conveying thick matter with the pump unit.

According to an advantageous embodiment of the invention it is provided that in the direction of travel of the trailer chassis in front of the pump unit and the drive motor an air-cooled hydraulic oil cooler is arranged, whereby in the direction of travel of the trailer chassis, preferably behind the drive motor, an air-cooled cooler for the drive motor is arranged, whereby the air routing through the two coolers is coupled to one another against the direction of travel of the trailer chassis so that the cooling air from the hydraulic oil cooler is at least partially guided through the cooler for the drive motor. Such an air routing enables coordinated cooling of the hydraulic system with the hydraulic pump and the drive motor, which is preferably designed as an internal combustion engine or an electric motor.

Further features, details and advantages of the invention will be apparent on the basis of the following description and on the basis of the drawings, which show embodiments of the invention. Corresponding objects or elements are provided with the same reference signs in all figures. Showing:

FIG. 1 thick matter pump according to the invention

Figure 2:
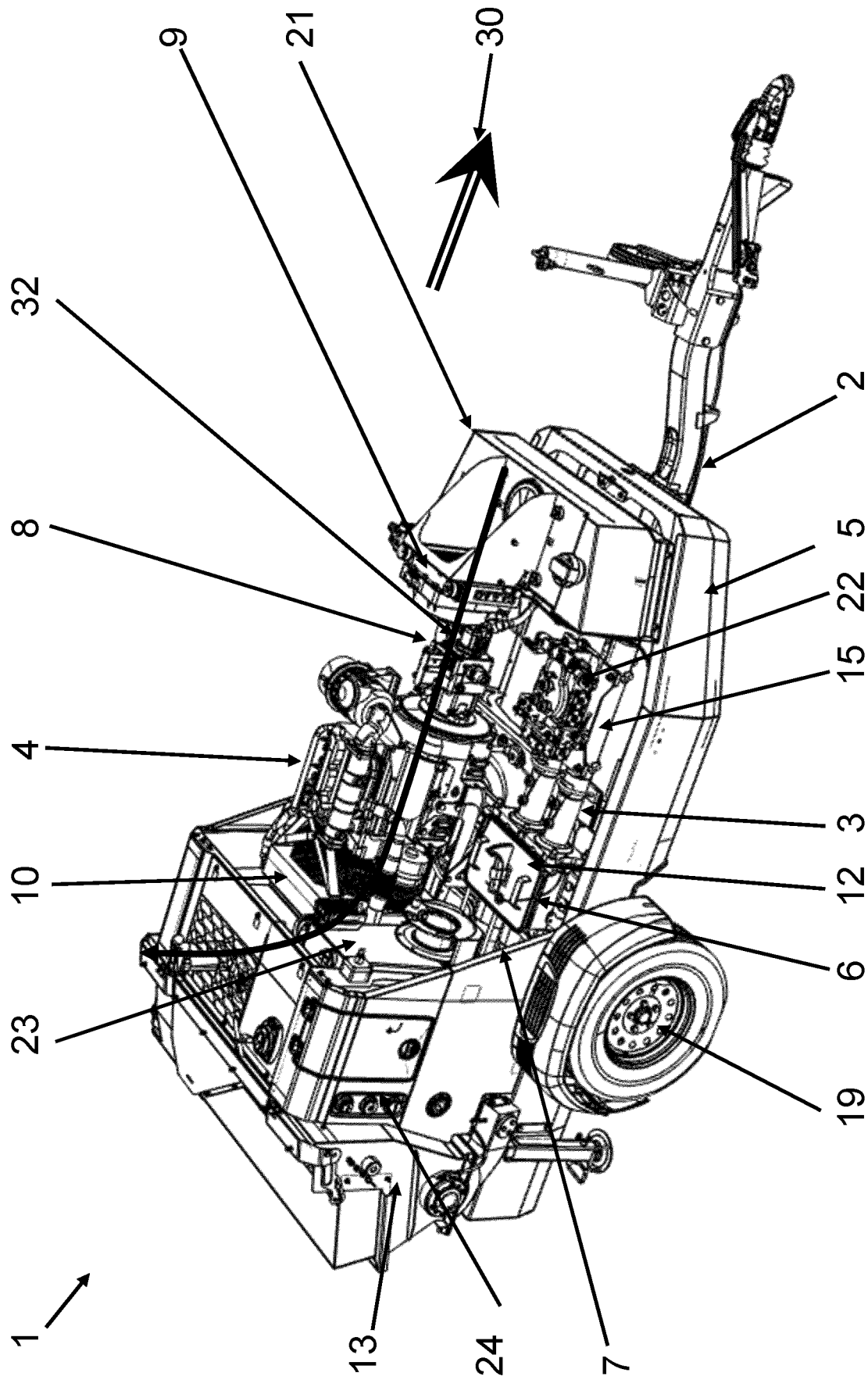
Figure 3:
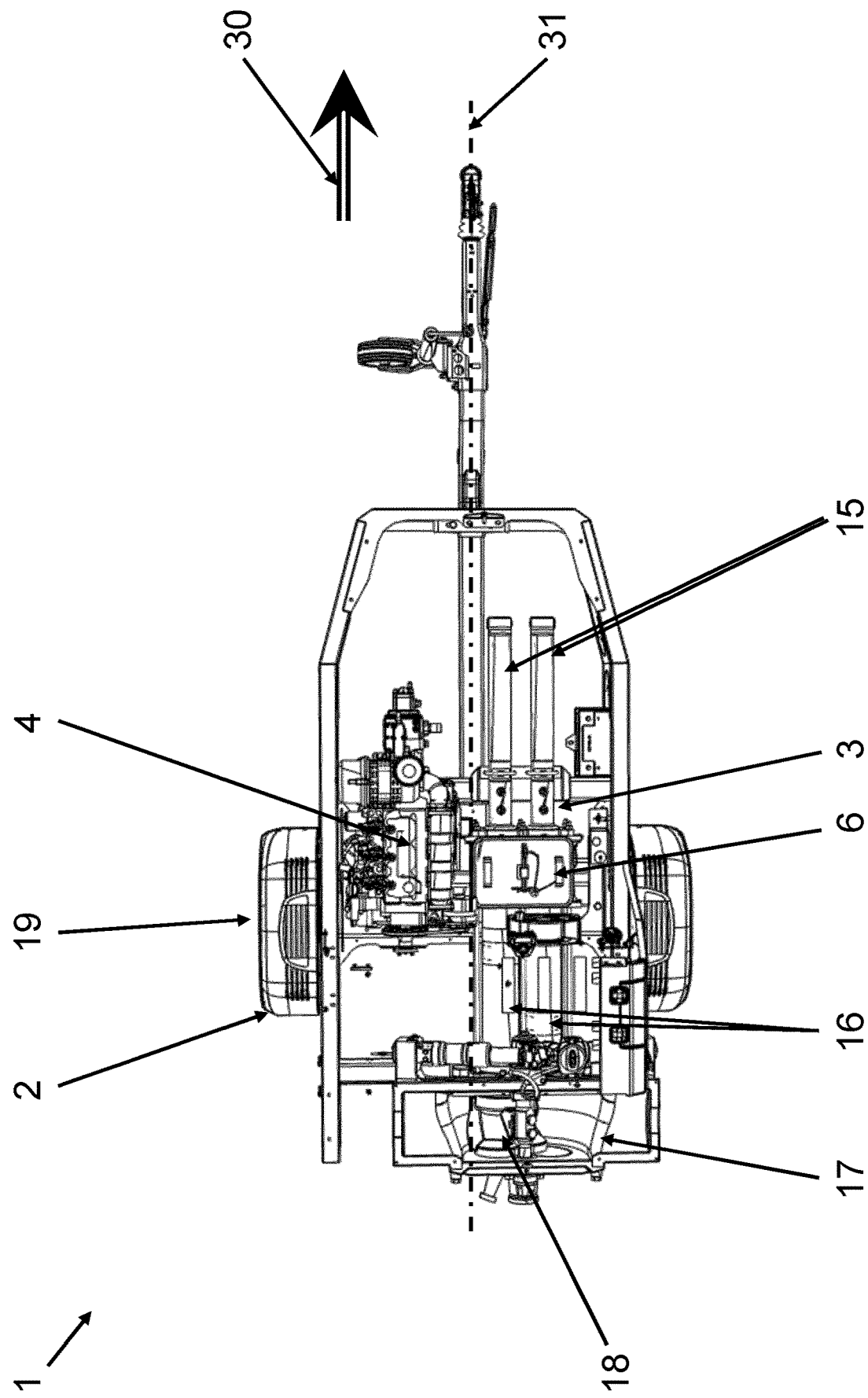
Figure 4:
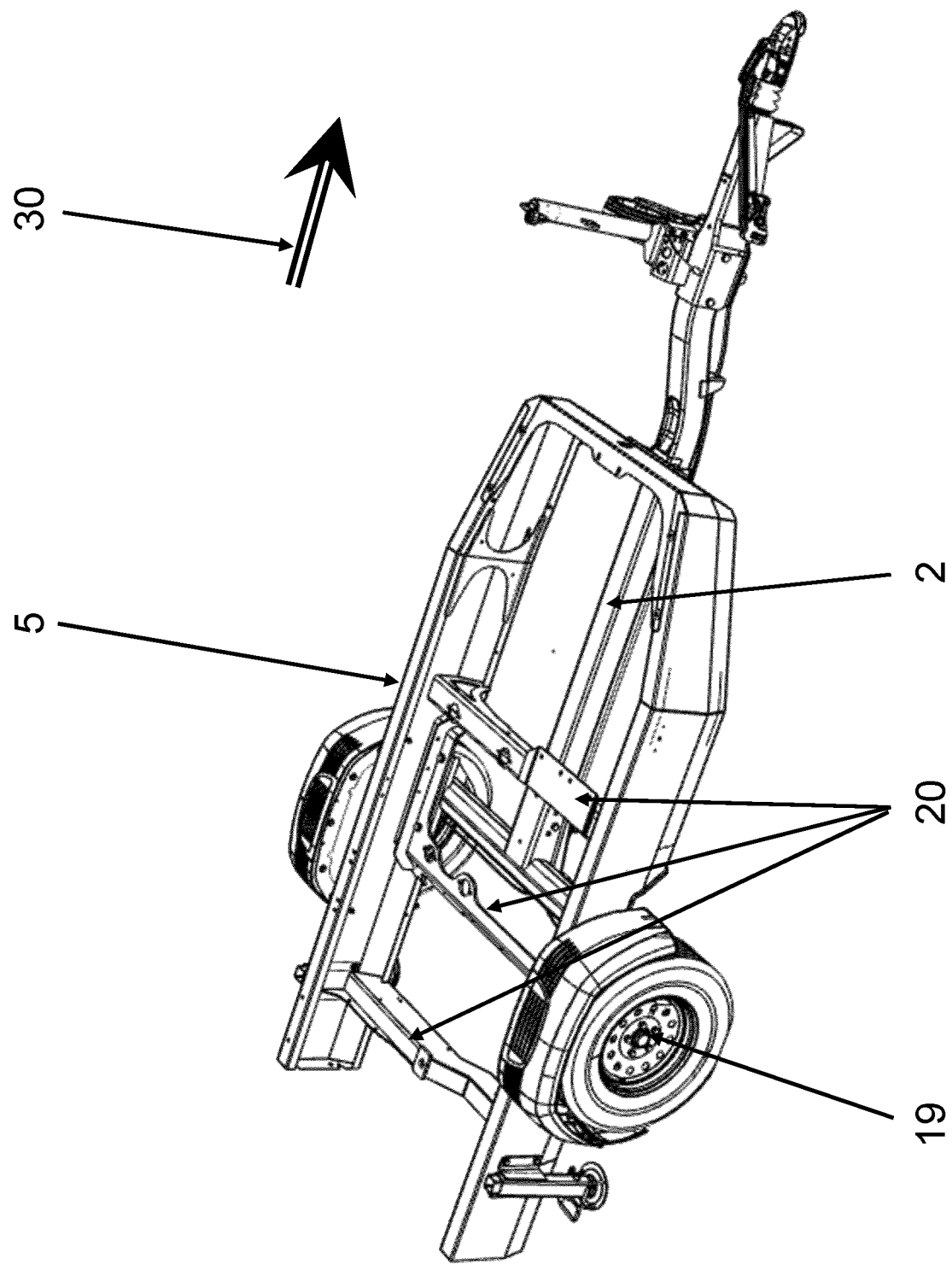
Figure 5:
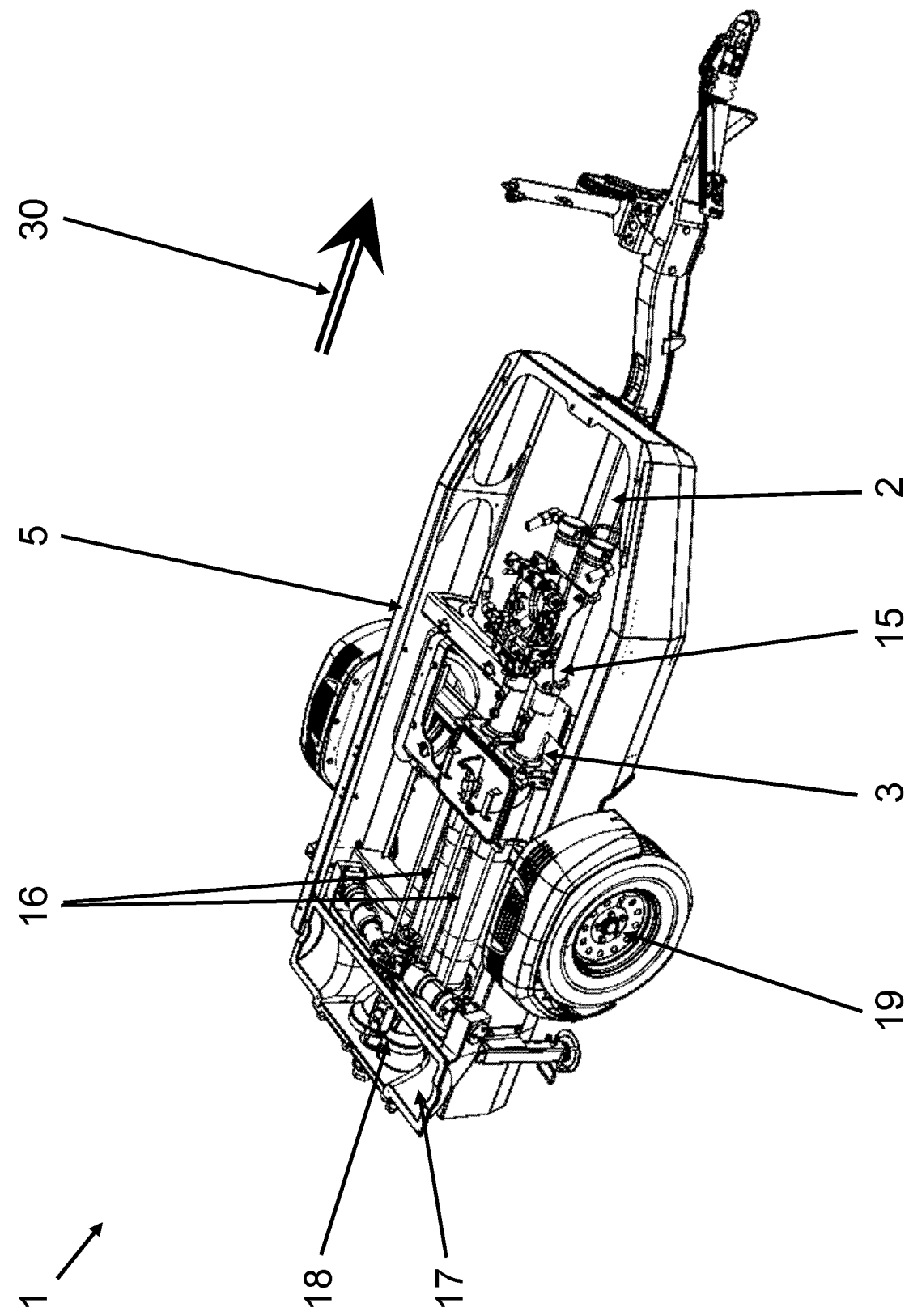

FIG. 2 thick-matter pump without hood,

FIG. 3 top view of thick matter pump,

FIG. 4 trailer chassis with body frame,

FIG. 5 trailer chassis with body frame and pump unit, and

Figure 6:
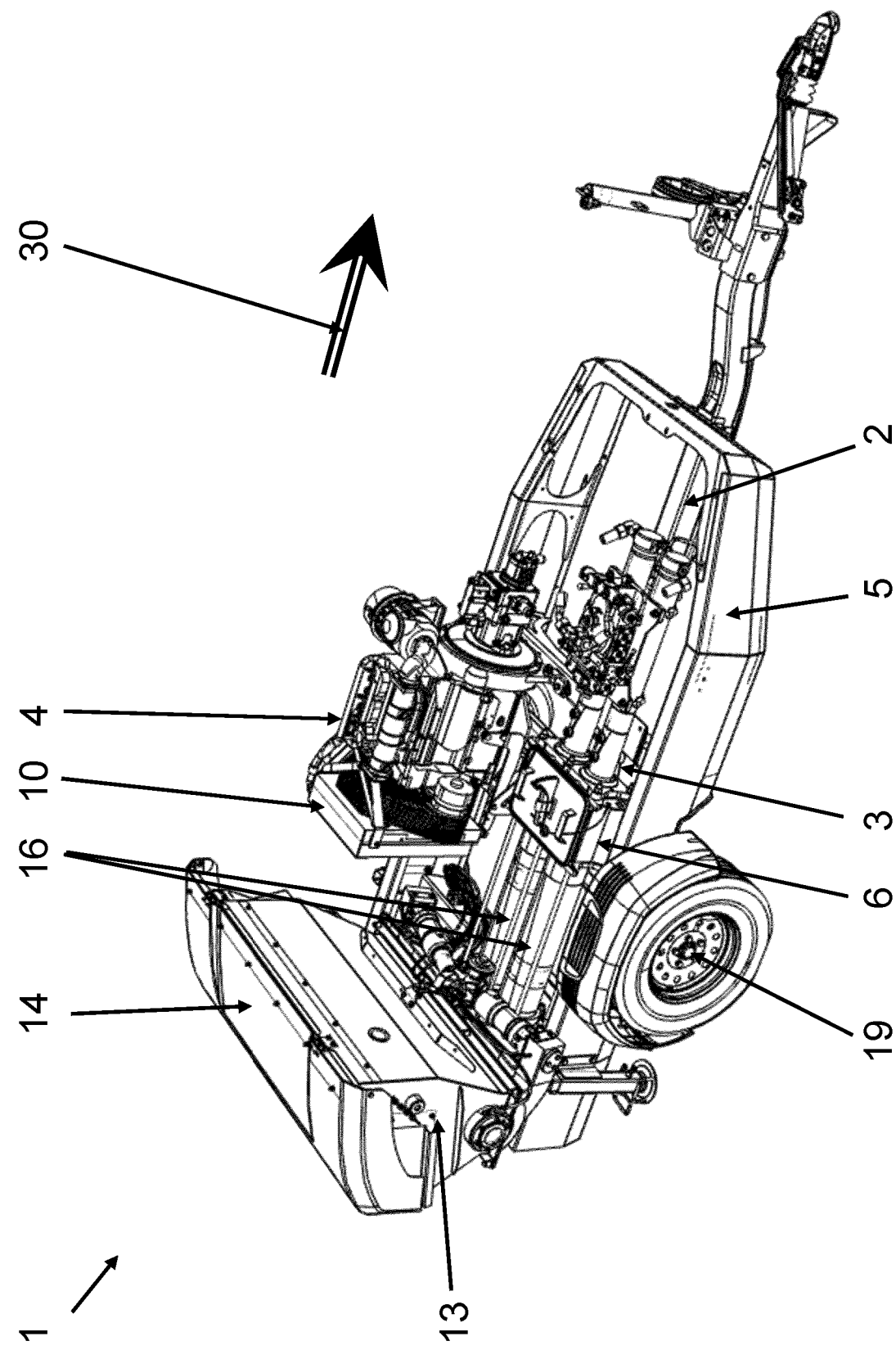

FIG. 6 trailer chassis with body frame and pump unit and drive motor.

FIG. 1, marked with the reference sign 1, shows a thick matter pump according to the invention. The thick matter pump 1 comprises a chassis 2 of a trailer. A body frame is arranged on this chassis 2, which is covered by a hood 11. Under the hood 11, there is a pump unit 3 (FIG. 2) arranged on the trailer chassis 2 and a drive motor 4 (FIG. 2) arranged on the trailer chassis 2, which drives the pump unit 3 (FIG. 2) for conveying thick matter.

These components of the thick matter pump 1 can be better seen in FIG. 2, where the hood 11 (FIG. 1) is removed. In FIG. 2, it can be seen that the pump unit 3 is arranged eccentrically on the trailer chassis (2), this means laterally offset in a first direction relative to the longitudinal center plane of the trailer chassis (2), while the drive motor (4) is also arranged eccentrically on the trailer chassis (2), namely laterally offset relative to the longitudinal center plane in a second direction opposite to the first direction. While the complete pump unit 3 is arranged to the right of the center 31 (FIG. 3) of the trailer chassis 2 in the direction of travel 30, the drive motor 4 is located opposite to the center 31 (FIG. 3) of the trailer chassis 2 on the left side of the trailer chassis 2 in the direction of travel 30. In this way, the pump unit 3 and the drive motor 4 are arranged side by side on the body frame 5. With the arrangement of the drive motor 4 next to the pump unit 3, which is laterally offset in the direction of travel 30, the pump unit 3 is accessible for maintenance work. The pump unit 3, which in this example is designed as a two-cylinder piston pump, has a water box 6 which is particularly easily accessible from above for maintenance work due to the lateral arrangement of the drive motor 4. For this purpose, a free space 7 is formed above the water box 6, which is exposed after removal of the cover 11 (FIG. 1). This allows the cover 12 of the water box 6 to be easily removed and the water box 6 can be easily opened for cleaning. It is also easy to change conveying pistons via the easily accessible water box 6. The drive motor 4, which can be designed as an internal combustion engine or electric motor, mechanically drives a hydraulic pump 8, via which the pump unit 3 is hydraulically driven. The thick matter pump 1 also has a hydraulic tank 21, a hydraulic control block 22, which is also easily accessible for maintenance and adjustment work, a fuel tank 23 and an operating and control unit 24. For reasons of clarity, FIGS. 2 to 6 do not show the hydraulic hoses between hydraulic pump 8 and pump unit 3, which are of course required. Pump unit 3 is supplied with thick matter to be conveyed via a feed hopper 13, which is arranged at the rear of trailer chassis 2. The feed hopper 13, which is arranged at the rear of the trailer chassis 2, has a pivotable hopper lid 14 with which an upper filling opening of the feed hopper 13 can be closed in a closed pivot position, as can be seen in FIG. 1.

In the direction of travel 30 of the trailer chassis 2 upstream of the pump unit 3 and the drive motor 4 an air-cooled hydraulic oil cooler 9 is arranged. In addition, an air-cooled cooler 10 for the drive motor 4 is arranged behind the drive motor 4 in the direction of travel 30 of the trailer chassis 2. The air routing 32, which is indicated as an arrow through the two coolers 9, 10 counter to the direction of travel of the trailer chassis 2 is coupled to one another in such a way that the cooling air from the hydraulic oil cooler 9 is guided at least partially through the cooler 10 for the drive motor 4.

Referring to FIG. 3, a top view of the thick matter pump 1 is given, with some components of the thick matter pump not shown for clarity. In this illustration, it can be seen that the pump unit 3 is arranged eccentrically on the trailer chassis 2 to the right of the chassis center 31 in the direction of travel 30 of the chassis 2, while the drive motor 4 is arranged offset to the left of the chassis center 31 in the direction of travel 30 of the chassis 2 next to the pump unit 3. The pump unit 3, consisting of two hydraulic drive cylinders 15, the water box 6, two delivery pistons 16 and a pipe diverter housing 17 with pipe diverter 18 are arranged offset to the drive motor 4 in such a way that the latter forms a counterweight to the pump unit 3 with respect to the chassis center 31 indicated by dashed dots. The pump unit 3 and the drive motor 4 are also counterbalanced to the wheel axle 19 of the chassis 2.

FIG. 4 shows a view of the chassis 2 with the body frame 5 mounted on it. The body frame 5 has a total of three inner cross beams 20 on which the drive motor 4 and the pump unit 3 are mounted side by side.

FIG. 5 shows the chassis 2 as shown in FIG. 4, with the pump unit 3 already mounted on the mounting frame 5. Next to the pump unit 3 there is sufficient space to mount the drive motor 4 (FIG. 6) here also on the mounting frame 5.

As can be seen from FIG. 6, the drive motor 4 is mounted on the mounting frame 5 next to the pump unit 3 in accordance with the invention, so that a compact design and good accessibility for maintenance work are provided.

Instead of the two-cylinder piston pump described here, the pump unit 3 can, for example, also be another pump unit suitable for conveying thick matter, such as a single-cylinder piston pump, a worm pump or a rotor pump. The two-cylinder piston pump is shown here lying down, i.e. the two pumping cylinders are located next to each other. However, it would also be conceivable to arrange the two pumping cylinders one above the other, for example.

LIST OF REFERENCE SIGNS 1 mobile thick matter pump
2 trailer chassis
3 pump unit
4 drive motor
5 body frame
6 water box
7 free space
8 hydraulic pump
9 hydraulic oil cooler
10 cooler for the drive motor
11 hood
12 cover (water box)
13 feed hopper
14 feed hopper cover
15 drive cylinder
16 conveying piston
17 pipe diverter housing
18 pipe diverter
19 wheel axle
20 cross beam
21 hydraulic oil tank
22 hydraulic control block
23 fuel tank
24 operating and control unit
30 direction of travel
31 Center of trailer chassis
32 air routing

The invention claimed is:

1. A mobile thick matter pump for conveying thick matter, the mobile thick matter pump comprising:
a trailer chassis having a longitudinal center plane;
a pump unit arranged on the trailer chassis and comprising a two-cylinder piston pump and a water box, the two-cylinder piston pump comprising a first cylinder, a first delivery piston, a second cylinder, and a second delivery piston, the water box including a cover; and a drive motor arranged on the trailer chassis and configured to drive the pump unit to convey thick matter, wherein the pump unit is arranged eccentrically on the trailer chassis such that the pump unit is laterally offset in a first direction relative to the longitudinal center plane of the trailer chassis, wherein the drive motor is arranged eccentrically on the trailer chassis such that the drive motor is laterally offset relative to the longitudinal center plane in a second direction opposite to the first direction, wherein the water box is accessible from above for replacing the first and second delivery pistons via a free space formed above the water box as a result of the drive motor being laterally offset, wherein the free space above the water box allows the cover to be opened.

2. The thick matter pump of claim 1, wherein the trailer chassis comprises a body frame, wherein the pump unit and the drive motor are arranged side by side on the body frame.

3. The thick matter pump of claim 1, further comprising a hydraulic pump, wherein the drive motor is configured to mechanically drive the hydraulic pump via which the pump unit is hydraulically driven.

4. The thick matter pump of claim 1, further comprising:
a first cooler having a first air routing, wherein the first cooler is an air-cooled hydraulic oil cooler arranged in front of the pump unit and the drive motor along a direction of travel of the trailer chassis; and
a second cooler having a second air routing, wherein the second cooler is an air-cooled cooler for the drive motor is arranged behind the drive motor along the direction of travel of the trailer chassis,
wherein the first air routing through the first cooler and the second air routing through the second cooler is coupled to one another against the direction of travel of the trailer chassis such that cooling air from the first cooler is at least partially guided through the second cooler.

* * * * *